H. D. JAMES.
SYSTEM OF ELECTRIC MOTOR CONTROL.
APPLICATION FILED MAY 9, 1908.
1,087,494.
Patented Feb. 17, 1914.
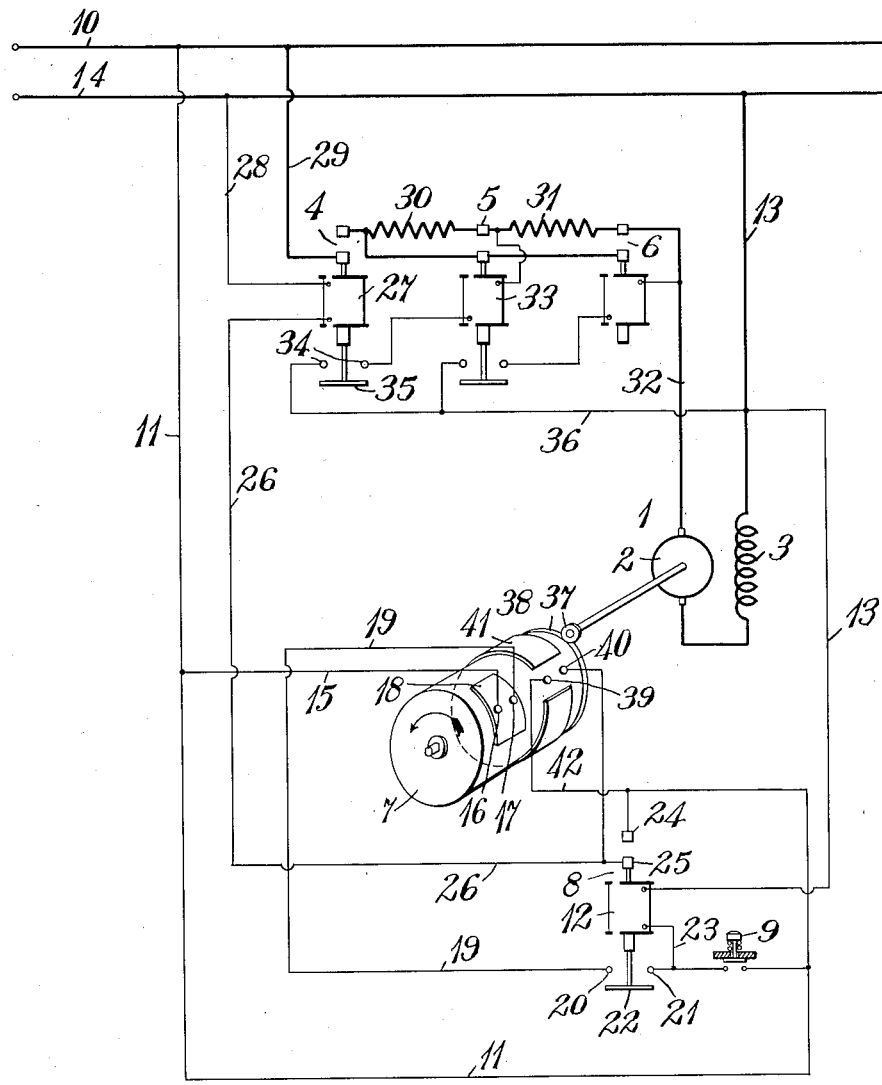
WITNESSES:
Fred H. Miller
INVENTOR
Henry D. James
BY
Wesley G. Carr
ATTORNEY

UNITED STATES PATENT OFFICE.

HENRY D. JAMES, OF PITTSBURGH, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

SYSTEM OF ELECTRIC-MOTOR CONTROL.

1,087,494.  Specification of Letters Patent.  Patented Feb. 17, 1914.

Application filed May 9, 1908. Serial No. 431,832.

*To all whom it may concern:*

Be it known that I, HENRY D. JAMES, a citizen of the United States, and a resident of Pittsburgh, in the county of Allegheny and State of Pennsylvania, have invented a new and useful Improvement in Systems of Electric-Motor Control, of which the following is a specification.

My invention relates to systems of electric motor control, and it has for its object to provide a system of this class that shall embody improved means for so limiting the travel of a motor that it may be brought to rest after having completed a predetermined cycle and for arranging the motor circuit connections for a repetition of the cycle.

In systems of control for governing the top mechanism of blast furnaces, and for other purposes, it is desirable to operate an electric motor or a plurality of electric motors until a predetermined function is performed, after which the motor should be brought to rest until the next cycle of operation is instigated when the movements should be repeated.

According to my present invention, I provide an electric motor, a switching device operatively connected thereto, a relay switch associated with the switching device, and a manually-operated switch for starting the cycle of operations.

The single figure of the accompanying drawing is a diagrammatic view of a control system arranged in accordance with my invention.

Referring to the drawing, an electric motor 1 having an armature 2 and a field magnet winding 3, is controlled directly by a plurality of electrically operated accelerating switches 4, 5, and 6 which are governed by a controller 7, the latter being operatively connected to the motor 2. A relay switch 8 is associated with the controller 7 and a predetermined motor action, which is controlled automatically, is initiated by a manually-operated switch 9.

The operation of, and the circuit connections for, the system are as follows: Assuming that the parts occupy the positions shown in the drawing, except that the switch 9 is temporarily closed, a circuit is established from a positive conductor 10 through control conductor 11, switch 9, magnet winding 12 of relay switch 8, and conductor 13 to a negative line conductor 14. The relay switch magnet 12, being energized, will close the switch 8 and establish a circuit from the conductor 11 through a conductor 15, contact members 16 and 17 (which are bridged by a contact ring segment 18 of the controller 7), conductor 19, contact members 20 and 21 (which are bridged by a contact member 22 when the relay switch is closed), and a conductor 23 to the winding 12, from which point circuit is completed as before. The circuit through the actuating magnet 12 of the relay switch 8 is thus made independent of the switch 9 and another control circuit is established from the conductor 11 through the main contact members 24 and 25 of the relay switch, conductor 26, actuating magnet winding 27 of the accelerating switch 4, and conductor 28 to the negative line conductor 14. When the winding 27 is energized, the switch 4 is closed thereby and establishes a motor circuit from the positive line conductor 10 through conductor 29, switch 4, resistance sections 30 and 31, conductor 32, armature 2 and field magnet winding 3 of the motor 1 and conductor 13 to the negative line conductor 14. As soon as the counter electromotive force of the motor is sufficiently reduced, a control circuit is established from the point of connection between the resistance sections 30 and 31 through magnet winding 33 of the switch 5, and auxiliary contact members 34 (which are bridged by the contact member 35 when the switch 4 is closed), conductor 36 and conductor 13 to the negative conductor 14. Thus the switch 5 is closed and the resistance 30 is short-circuited so that the motor is accelerated. Movement of the switch 6 to closed position is dependent upon closure of the switch 5 and upon the counter electromotive force of the motor, its circuit connections corresponding to those of the switch 5.

As the motor operates and performs the function for which it is intended, the controller 7 is driven through reducing gears 37 and 38 in a counter-clockwise direction. A pair of contact fingers 39 and 40 are soon brought into engagement with a ring segment 41, the arrangement of parts being such that the fingers 16 and 17 still engage the ring segment 18, the circuit for the accelerating switch 4 being now completed independently of the relay switch 8, as follows: From conductor 11 through a conductor 42, contact members 39 and 40 (which are bridged by the contact member 41) and conductor 26 to the magnet winding 27, from which point circuit is completed, as before. As soon as contact member 18 becomes disengaged from the contact fingers 16 and 17, the circuit formerly established through the magnet winding 12 is interrupted and the relay switch is opened but the motor will continue to operate until the contact fingers 39 and 40 become disengaged from the contact member 41, whereupon the circuit established through the magnet winding 27 of the accelerating switch 4 will be interrupted and, consequently, the switches 4, 5, and 6 will be successively opened. The gear ratio between the motor 1 and the controller drum and the percentage of the drum circumference which is covered by the ring segment 41 are so arranged as to permit the motor to operate for the desired length of time. The ring segment 18 overlaps the ends of the ring segment 41 so that the contact fingers 16 and 17 are brought into engagement with segment 18 before the contact fingers 29 and 40 are separated from the ring segment 41 and, consequently, it is possible to again start the motor by temporarily closing the switch 9.

It will be understood that modifications in the circuit connections and switch details may be made within the spirit and scope of my invention.

I claim as my invention:

1. In a control system, the combination with an electric motor and means for causing it to accelerate in speed, of control means, embodying a relay switch for automatically stopping the motor at a predetermined point in its operation and for restricting repeated operations of the motor to a single direction.

2. In a control system, the combination with an electric motor and means for causing it to accelerate in speed, of a relay switch and a controller having an operative connection to the motor and coöperating with the relay switch for bringing it to rest at a predetermined point in its operation and for restricting repeated operations of the motor of the same extent to a single direction.

3. In a control system, the combination with an electric motor, accelerating switches therefor adapted to close in a predetermined sequence, a controller operatively connected to the motor and an electro-responsive relay switch coöperating with the controller to govern the accelerating switches, of a manually operated switch for closing the relay switch, said controller being adapted to stop the motor at a predetermined point in its operation.

4. In a control system, the combination with an electric motor, electrically operated accelerating switches therefor, a drum controller operatively connected to the motor, and a relay switch coöperating with the drum controller to govern the accelerating switches, of a manually operated switch for closing the relay switch, said drum switch being adapted to stop the motor at a predetermined point in its operation and to provide only for a repeated operation of the motor in the same direction.

5. In a control system, the combination with an electric motor, a starting resistance therefor, a plurality of independently operated short circuiting switches for the resistance, a limit switch operatively connected to the motor and a relay switch which coöperates therewith to govern the short circuiting switches, of a master switch for actuating the relay switch, said limit switch being adapted to stop the motor at a predetermined point in its operation and to prevent the actuation of the relay switch except when the motor is at rest.

6. In a control system, the combination with an electric motor and means for causing it to accelerate in speed, of a controller and a mechanically independent control means coöperating therewith for automatically stopping the motor at a predetermined point in its operation and for restricting repeated operations of the motor to a single direction.

7. In a control system, the combination with an electric motor and means for causing it to accelerate in speed, of a controller and a mechanically independent control means coöperating therewith for automatically stopping the motor at a predetermined point in its operation and for restricting repeated operations of the motor to a single direction, said controller being operatively connected to the motor and adapted to render the independent control means inoperative during substantially the period of motor operation.

In testimony whereof, I have hereunto subscribed my name this 1st day of May, 1908.

HENRY D. JAMES.

Witnesses:
W. L. WATERS,
BIRNEY HINES.